April 14, 1931. S. I. NEHER 1,800,871
AGRICULTURAL IMPLEMENT
Filed Dec. 7, 1927 11 Sheets-Sheet 6
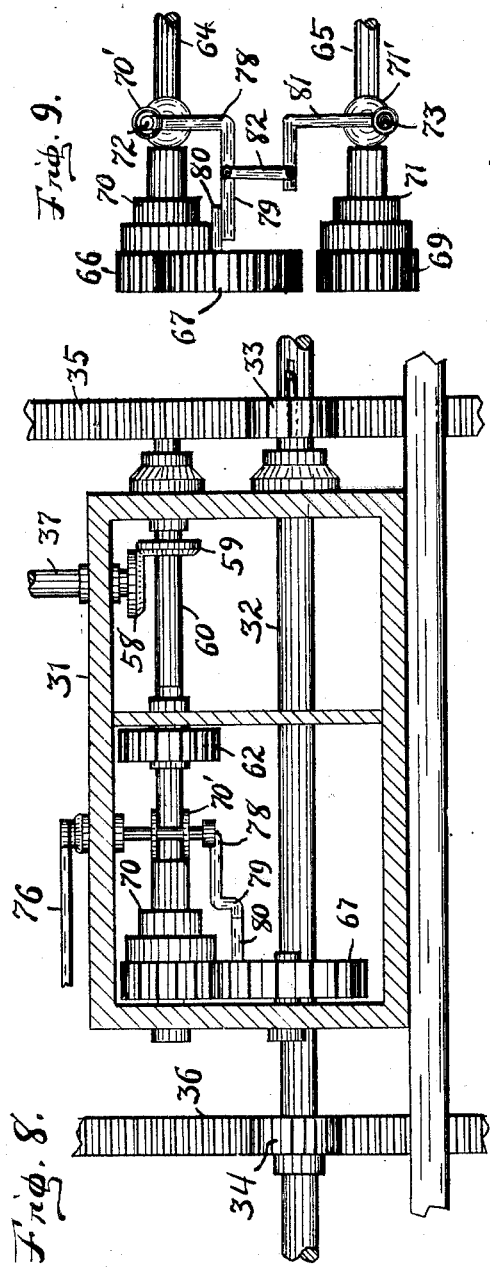
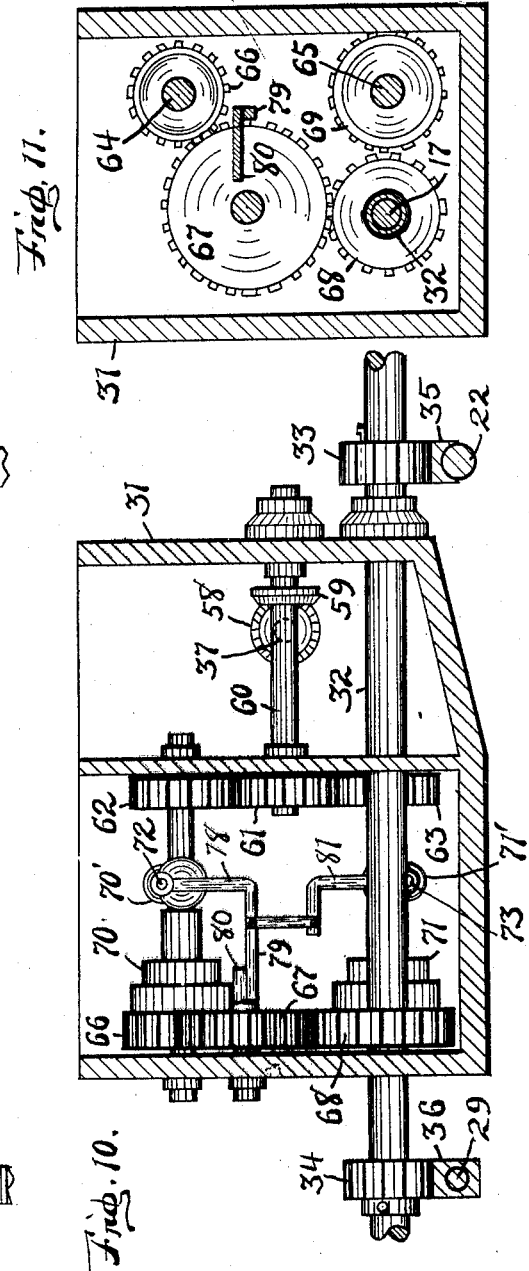
INVENTOR.
Samuel I. Neher
BY
H. G. Burns ATTORNEY.

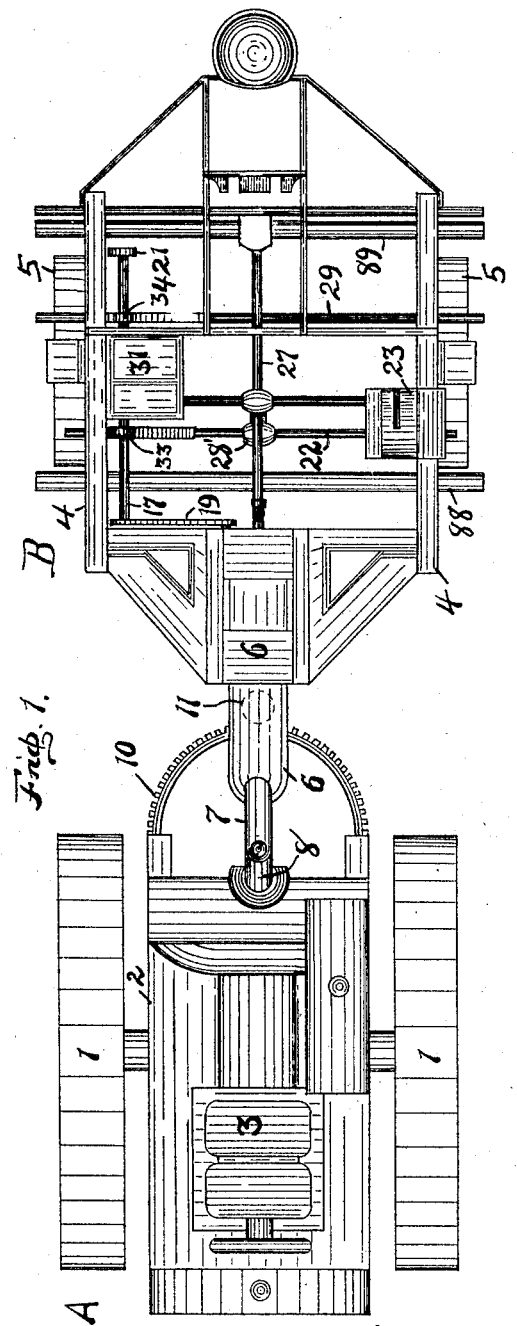

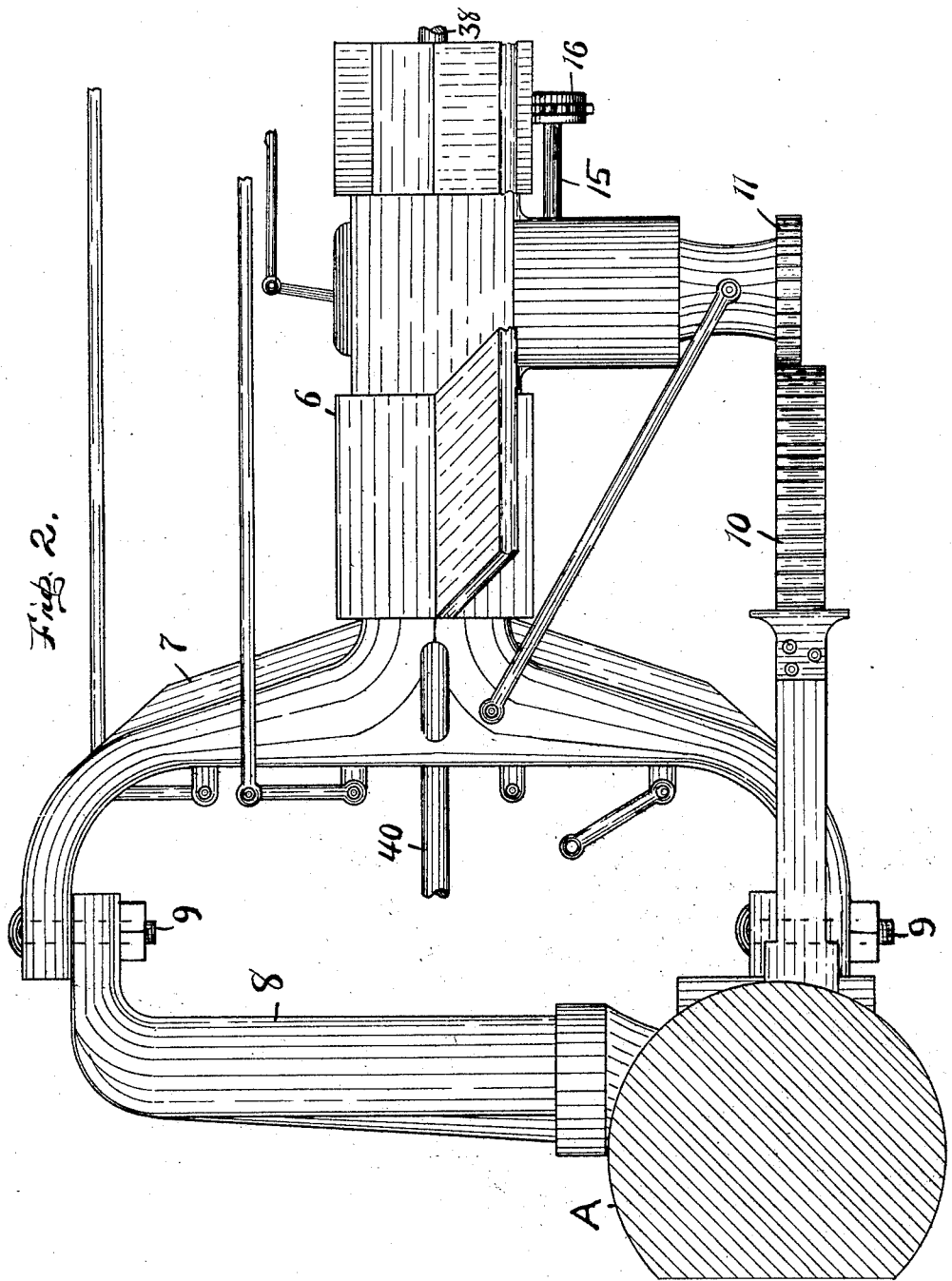

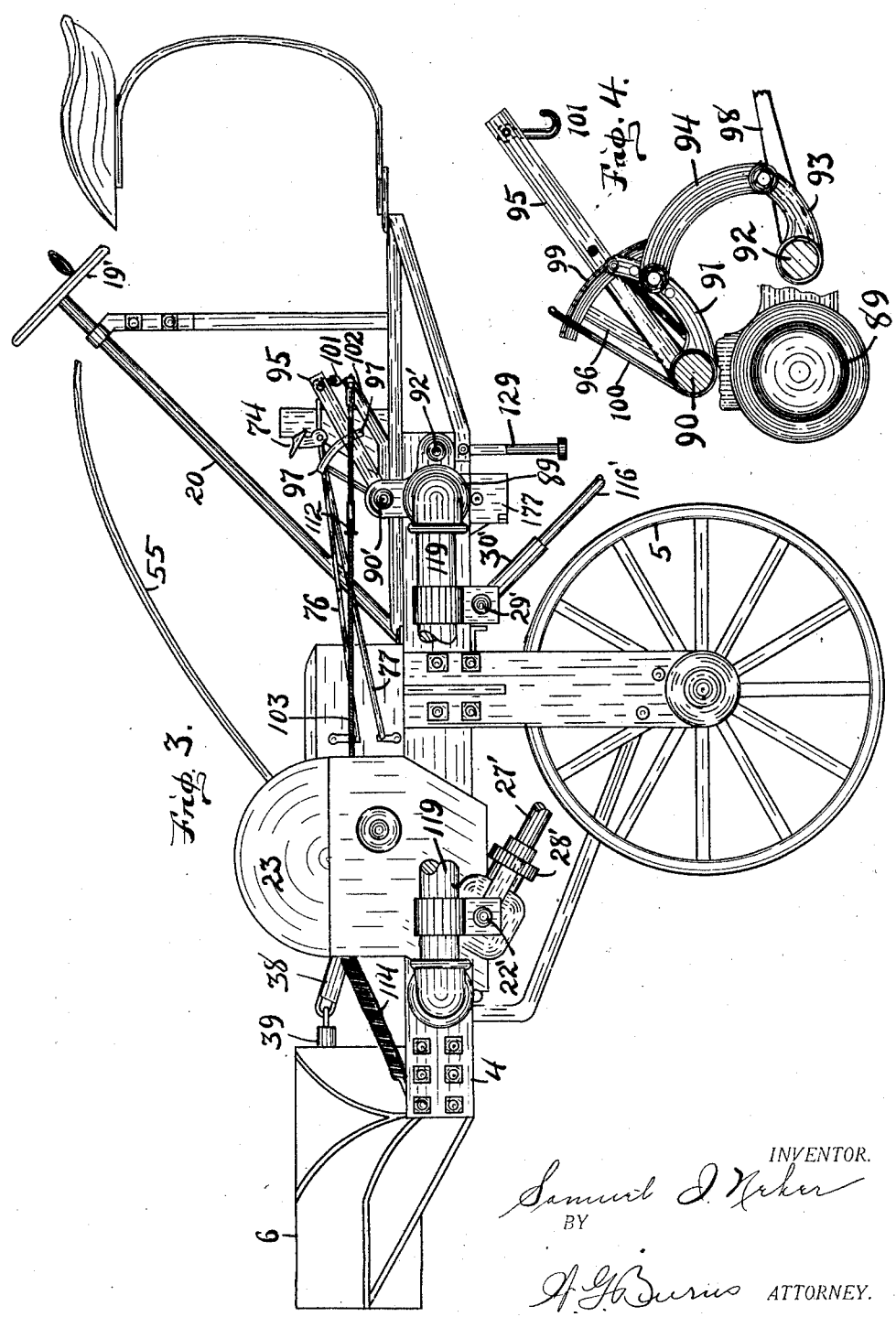

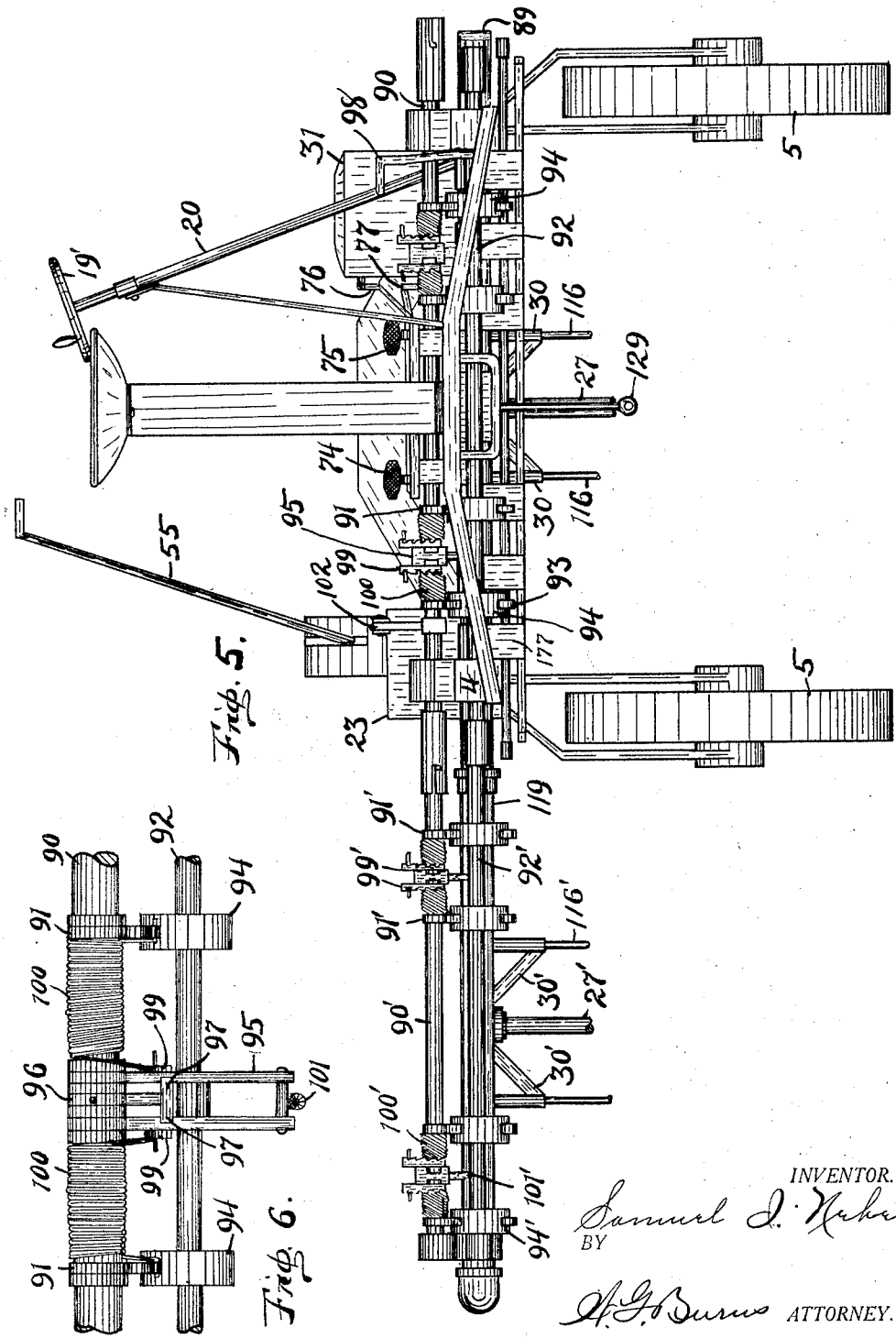

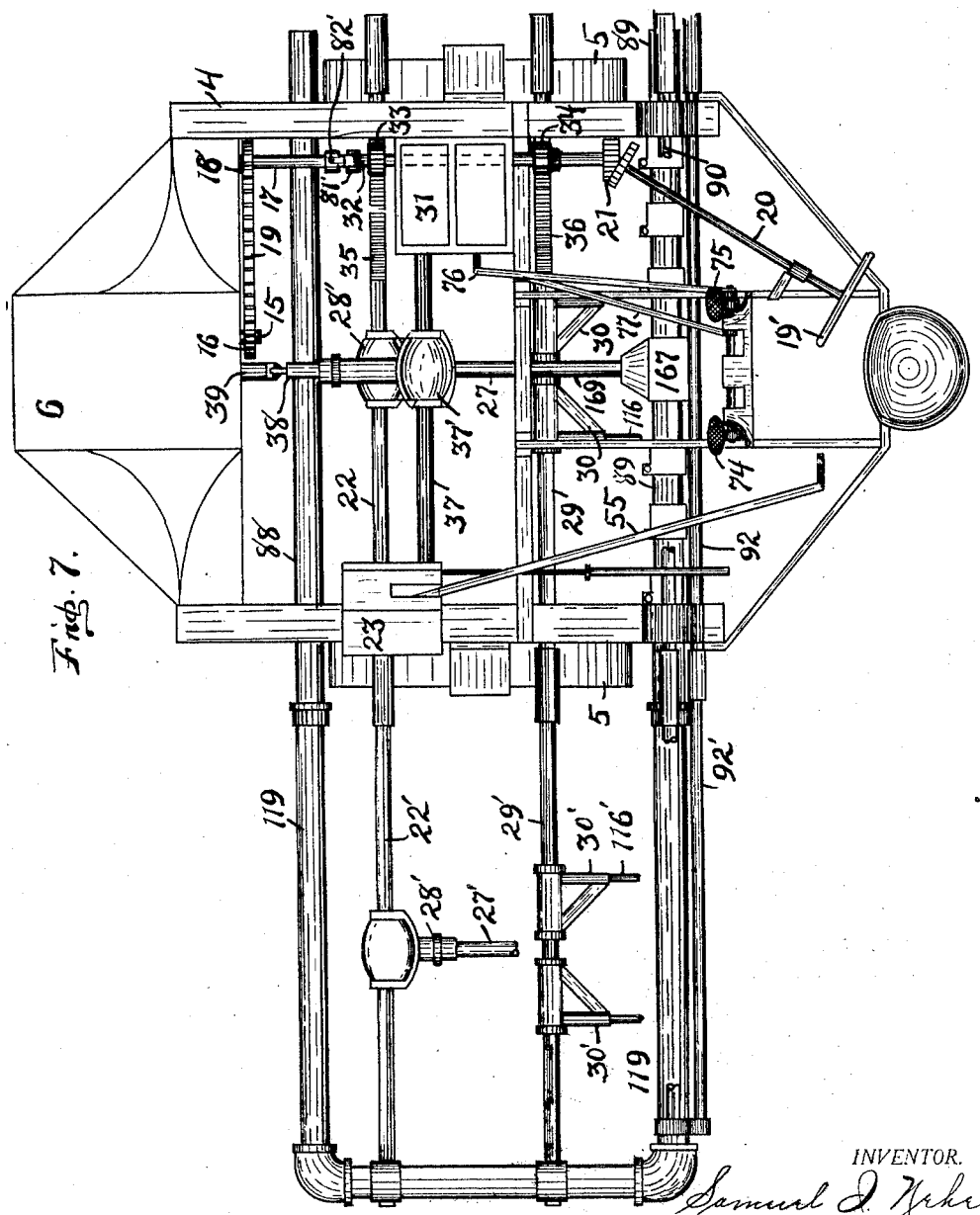

April 14, 1931. S. I. NEHER 1,800,871
AGRICULTURAL IMPLEMENT
Filed Dec. 7, 1927 11 Sheets-Sheet 7
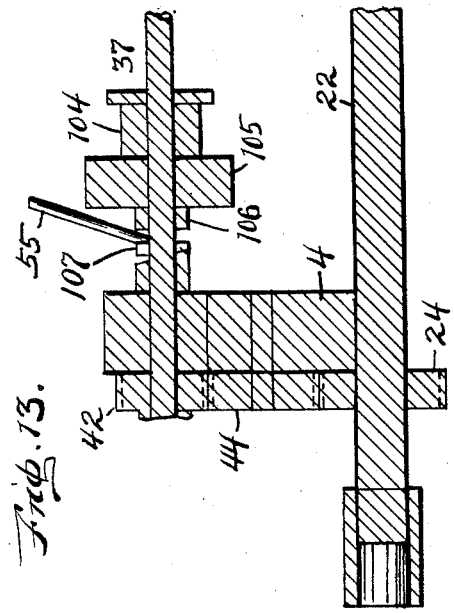
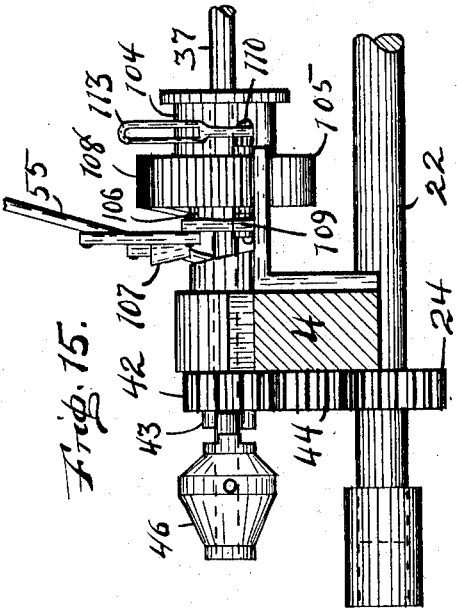
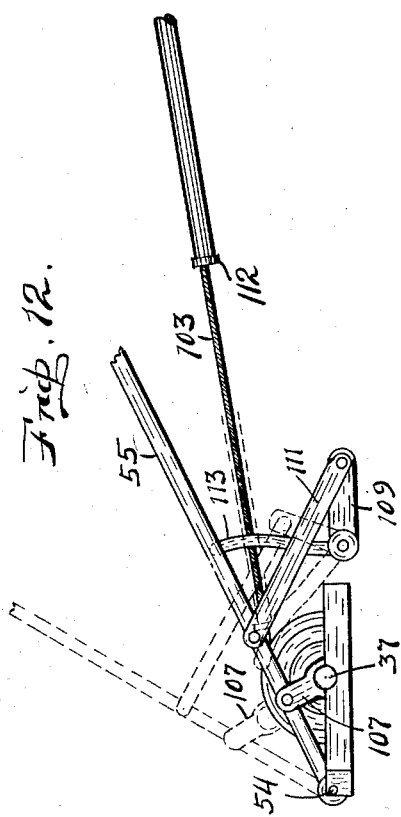
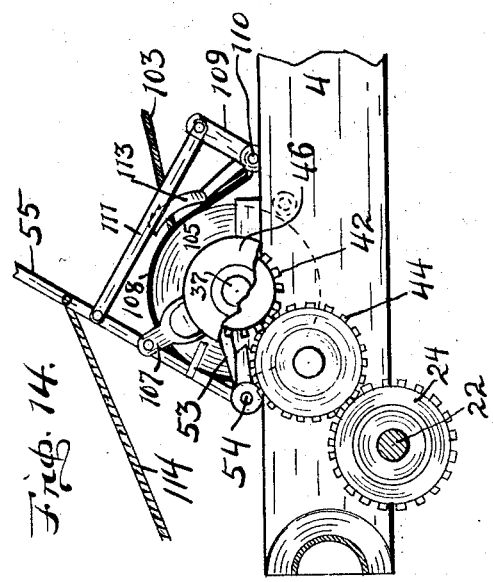
INVENTOR.
Samuel I. Neher
BY
H. H. Burns ATTORNEY.

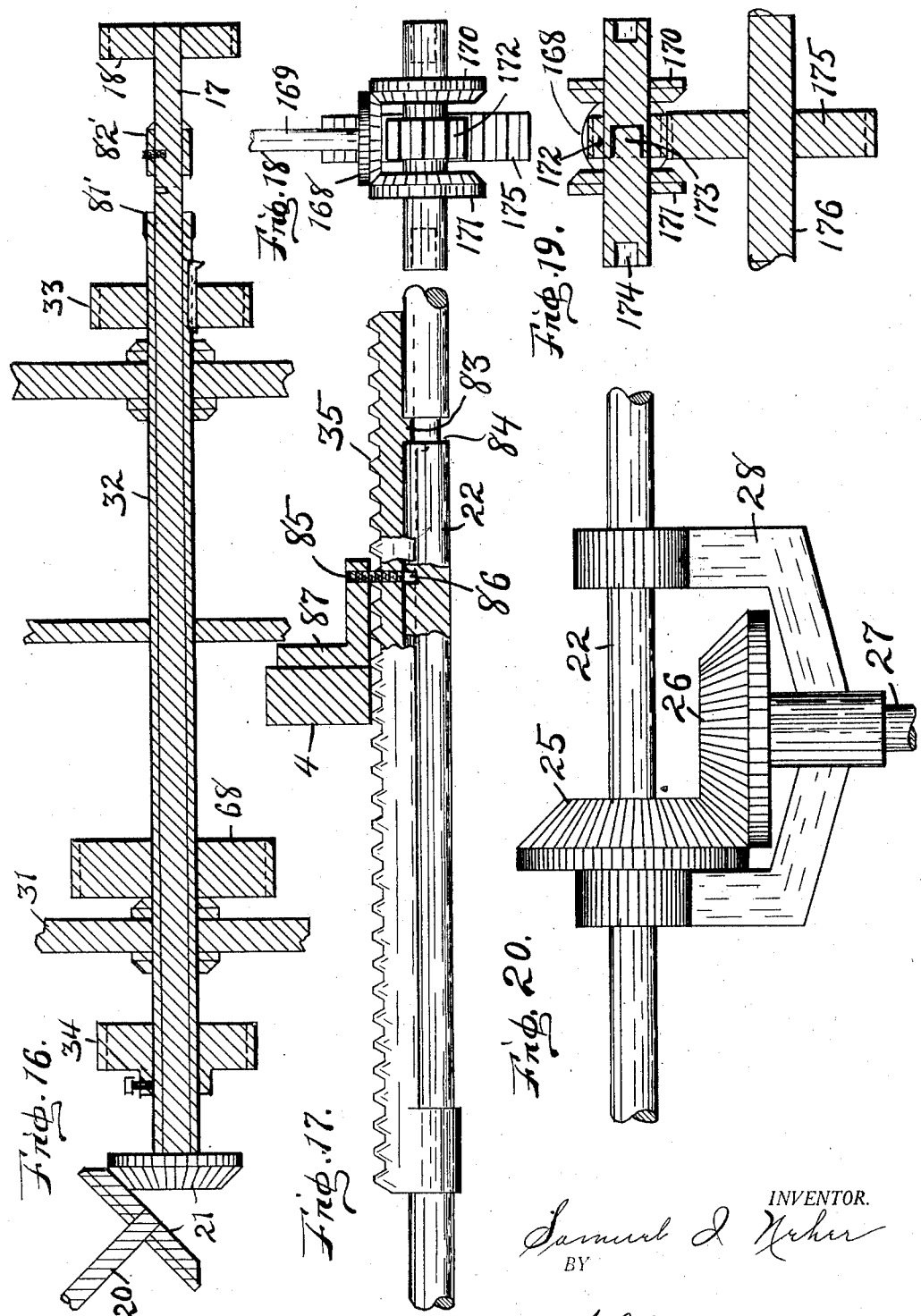

April 14, 1931.  S. I. NEHER  1,800,871
AGRICULTURAL IMPLEMENT
Filed Dec. 7, 1927     11 Sheets-Sheet 9
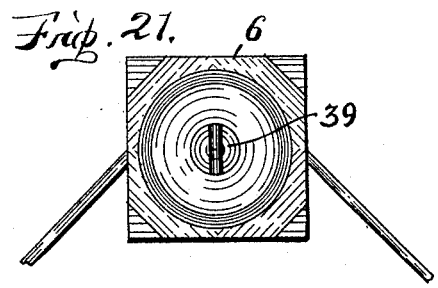
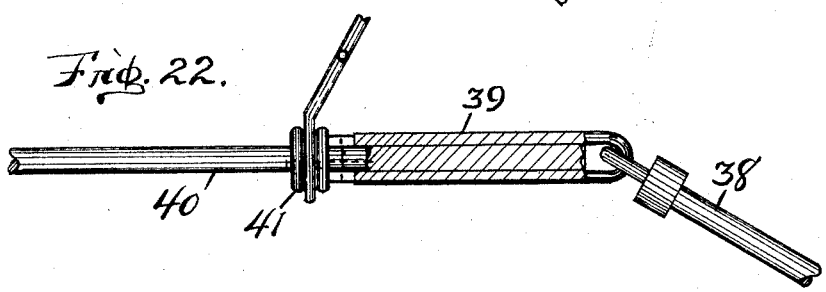
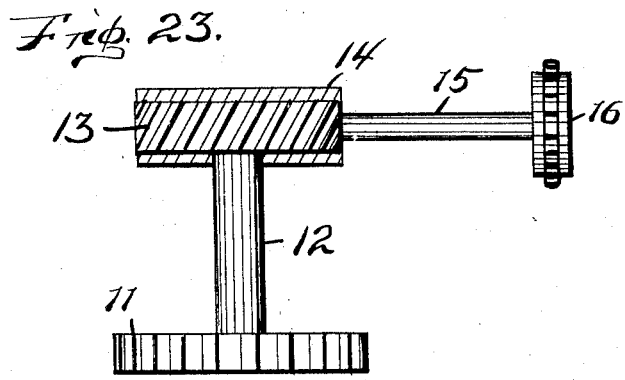
INVENTOR.
Samuel I. Neher
BY
 Burns ATTORNEY.

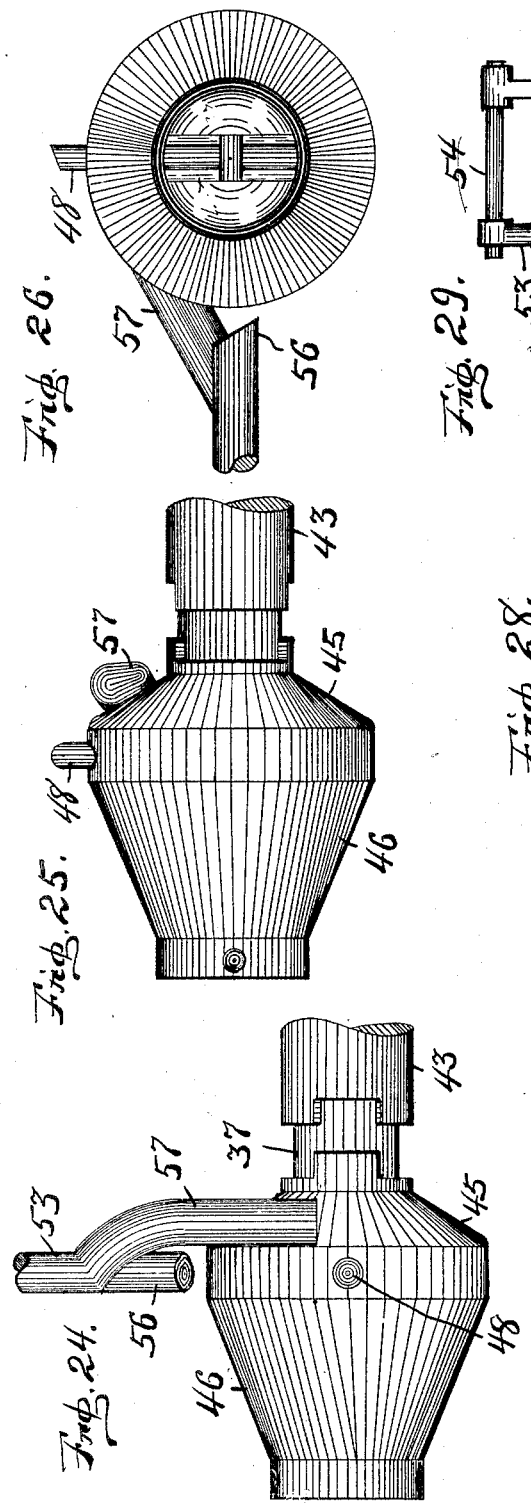
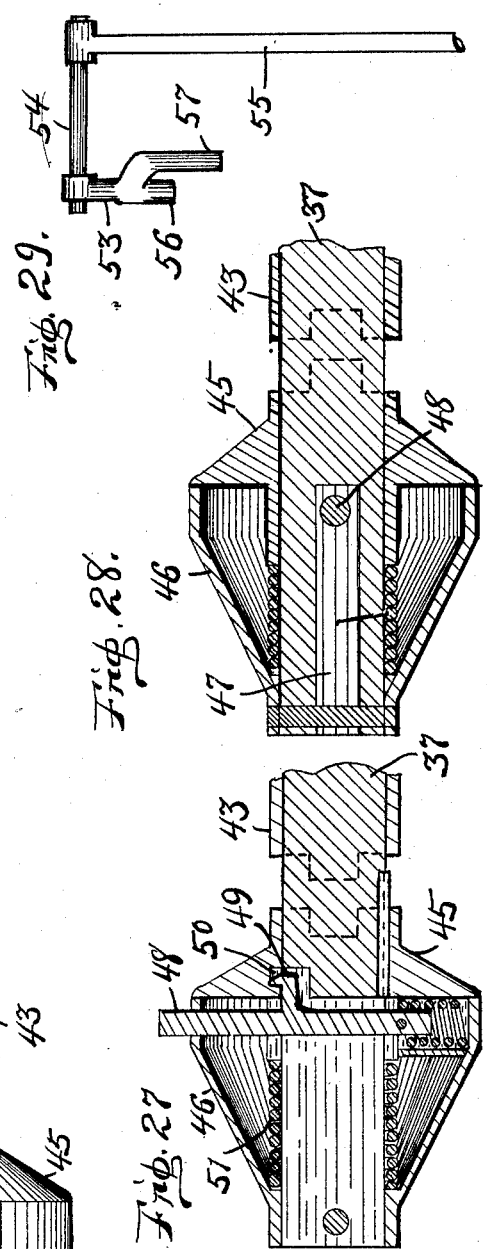

April 14, 1931.  S. I. NEHER  1,800,871
AGRICULTURAL IMPLEMENT
Filed Dec. 7, 1927  11 Sheets-Sheet 11

INVENTOR.
Samuel I. Neher
BY
A. G. Burns ATTORNEY.

Patented Apr. 14, 1931

1,800,871

UNITED STATES PATENT OFFICE

SAMUEL I. NEHER, OF FORT WAYNE, INDIANA

AGRICULTURAL IMPLEMENT

Application filed December 7, 1927. Serial No. 238,260.

This invention relates to improvements in agricultural implements for operating cultivators, planters and similar devices, and the objects thereof are to afford a power driven means for maneuvering and actuating various farm machines with facility, and to so construct the appliance as to be readily attached in operable relation with said machines.

These objects are attained by the construction illustrated in the accompanying drawings, in which:—

Fig. 1 is a plan view of a tractor and a wheeled carrier in connection therewith embodying the invention;

Fig. 2 is a side elevation of the coupling between the tractor and carrier;

Fig. 3 is a side elevation of the carrier, a portion being broken away;

Fig. 4 is an enlarged detail view of a portion of Fig. 3;

Fig. 5 is a rear elevation of a portion of the carrier and an extension thereof;

Fig. 6 is an enlarged detail portion of Fig. 5;

Fig. 7 is a plan view projected from Fig. 5;

Fig. 8 is a plan view of a clutch and transmission gearing employed in the apparatus, parts being in section;

Fig. 9 is a detail view of the clutch actuating mechanism shown in Fig. 8;

Fig. 10 is an elevation projected from Fig. 8, parts being in section;

Fig. 11 is a section of Fig. 10 on the lines 11—11 thereof;

Fig. 12 is a detail end view of another clutch mechanism employed in the invention;

Fig. 13 is a detail view in section of the structure shown in Fig. 12;

Fig. 14 is an end elevation of the structure shown in Figs. 12 and 13, and including additional parts;

Fig. 15 is an elevation projected from Fig. 14;

Fig. 16 is a longitudinal section of part of the steering apparatus;

Fig. 17 is a fragmentary view showing an adjustment of a part of the apparatus, a portion being in section;

Fig. 18 is a detail plan view of the motion transmitting mechanism employed in the invention;

Fig. 19 is a vertical section projected from Fig. 18;

Fig. 20 is a detail view of another gearing used in the apparatus;

Fig. 21 is a rear view showing one of the connections of the line shaft coupler;

Fig. 22 is a side view of the coupler, partly in section;

Fig. 23 is a detail view of the gearing for the steering mechanism;

Fig. 24 is a plan view of a clutch for the power transmitting mechanism;

Fig. 25 is a side view of the same;

Fig. 26 is an end view projected from Fig. 25;

Fig. 27 is a longitudinal section of Fig. 25;

Fig. 28 is another section of the same in a plane at right angles thereto;

Fig. 29 is a detail plan view of the shifter for the clutch shown in Figs. 24 to 28 inclusive;

Figure 30:
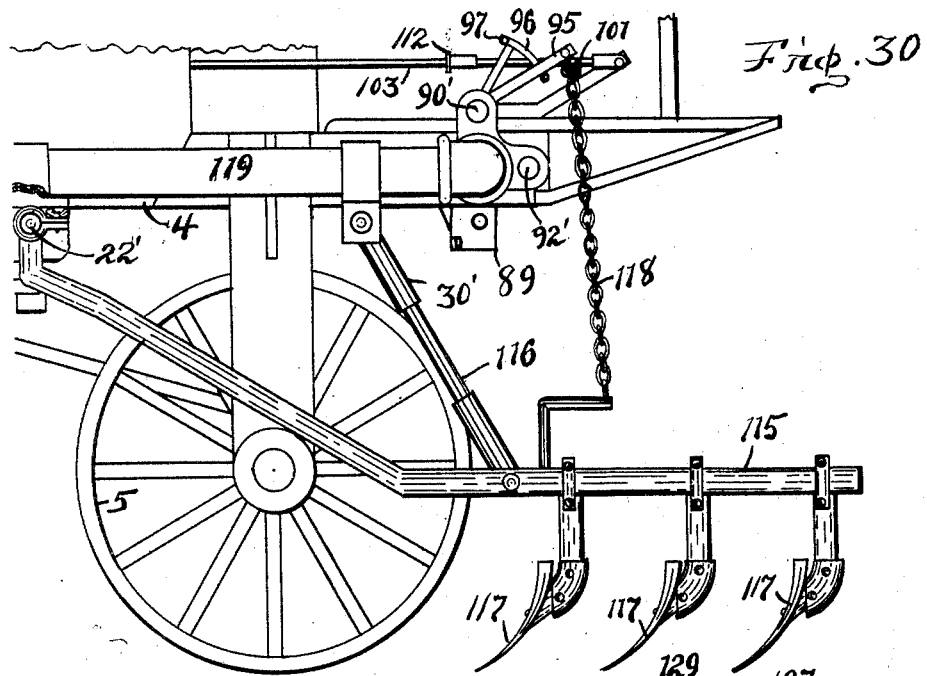
Fig. 30 is a side elevation of a cultivator shown attached to the carrier.

The invention consists of a tractor A and a wheeled carrier B arranged in connection with each other. The chassis of the tractor consists of two ground wheels 1, frame 2 and engine 3. The carrier has a chassis consisting of a frame 4 supported upon wheels 5, the frame being provided at its front end with a bearing 6 in which is positioned a bracket 7 that has turning movement in the bearing upon a horizontal axis that extends longitudinally with respect to the carrier. The tractor has fixed thereon a bracket 8 that has pivotal connection with the bracket 7 on the carrier by means of bolts 9, so that the carrier and tractor have relative turning movement upon a vertical axis. The tractor has fixed thereon a horizontally disposed segmental gear 10 at its rear end, and the carrier has a pinion 11 that meshes with the gear 10, whereby the carrier and tractor are relatively turned when the pinion is actuated. In this manner the direction of travel of the tractor and carrier is effected. Movement is imparted to the pinion 11 through a gearing (Fig. 23), there being a stub shaft 12 connecting the pinion and the worm-wheel, and a shaft 15 for the worm, upon which shaft is mounted a sprocket-wheel 16. A shaft 17 (Figs. 1 and 7) in the frame of the carrier has a sprocket-wheel 18 that is connected with the sprocket-wheel 16 by a chain 19, so that as the shaft 17 is rotated the pinion 11 is actuated accordingly and the steering operation is effected. Manual operation of the shaft 17 is effected by a hand-wheel 19' on a steering-post 20 that actuates the shaft 17 through the medium of beveled gears 21.

In the carrier frame 4 is horizontally disposed a transverse shaft 22 so as to have rotary and axial movement, which shafts extends through a gear case 23 containing mechanism including a gear 24 (Fig. 14) that is splined on said shaft and by which said shaft is rotated and in which the shaft has axial movement. Upon the shaft 22 is fixed a bevel gear 25 (Fig. 20) that meshes with a companion gear 26 fixed on a stub-shaft 27 which is journaled in a bracket 28 through which the shaft extends. By means of the gears 25 and 26 rotary movement is imparted to the shaft 27, to be connected to a farm machine attachment for actuating it. A housing 28' (Figs. 1 and 7) is provided for said gears.

Another shaft 29 is disposed in the frame 4 parallel to the shaft 22 and has axial sliding movement in said frame. The shaft 29 has thereon a pair of brackets 30 disposed so as to move with the shaft.

A transmission mechanism is contained in a housing 31 mounted on the frame B, through which extends a rotatable tube 32 having fixed thereon pinions 33 and 34, and on the shafts 22 and 29 are fixed corresponding rack-bars 35 and 36, so that when the tube is rotated, said shafts are moved axially.

A countershaft 37 (Fig. 7) extends into each gear case (23—31) and is actuated by gearing, such as shown in Fig. 20, contained in a housing 37', there being an actuating shaft 38 for said gearing whereby rotary movement is imparted from the shaft 38 to the counter-shaft 37. The shaft 38 (Fig. 22) has connection with the line-shaft 40 by means of a universal coupler 39, through which it receives rotary movement, the line-shaft being actuated by the engine 3. A clutch 41 is arranged in connection with the line-shaft 40 and coupler 39 for controlling the transmission of power from the engine to the shaft 38.

Within the gear case 23, on the shaft 37, is loosely mounted a gear 42 having a slotted hub 43 (Figs. 14 and 15), and an intermediate gear 44 is mounted so as to mesh with the gear 42 and the splined gear 24 on the shaft 22. The countershaft 37 has mounted thereon adjacent the hub 43 of the gear 42, a clutch-member 45 that has splined relation with said shaft and engaging relation with said hub, and a cup 46 is pinned on the shaft 37, the outer portion of which shaft has a slot 47, and a pin 48 is slidably positioned in said cup and extends through said slot, one end of which pin projects through the perimeter of the cup. The pin 48 has a hook 49 that has locking engagement with the clutch member 45 when the latter is moved out of engagement with the hub 43, there being a pocket 50 made in the clutch member for the reception of the hook. When said clutch member 45 is released, it is moved into engagement with the hub 43 by action of a spring 51 disposed within the cup, and another spring 52 in said cup tends to press and hold the pin 48 in locking position. By this mechanism, when the clutch is engaged with the hub 43, rotary movement is imparted to the shaft 22 through the medium of the gears 42, 44 and 24. The clutch 45 is controlled by a fork 53 (Figs. 14, 24 and 29) fixed on a shaft 54 that is oscillated by a lever 55. The fork has two fingers 56 and 57 that have engaging relation respectively with the pin 48 so that the clutch is released when the pin strikes the finger 56 and engages the hub 43. The clutch is thrown out of engagement and into locked position when pressed by the finger 57.

A reversible gearing (Figs. 8–11) is contained in the gear case 31 and is actuated by the countershaft 37 which is provided with a gear 58 that meshes with a companion gear 59 on a shaft 60. A gear 61 fixed on the shaft 60, meshes with a pair of gears 62 and 63 that are fixed respectively upon a corresponding pair of shafts 64 and 65, and a gear 66 fixed on the shaft 64 meshes with a back gear 67, and another gear 68 fixed on the tube 32, also meshes with said back gear. A gear 69 fixed on the shaft 65 meshes with the gear 68, and a clutch 71 on the shaft 65 has engaging relation with a gear 69 thereon, which gear meshes with the gear 68. Each of the clutches 70 and 71 has a corresponding actuating member 70' and 71' mounted on corresponding shafts 72 and 73 that are actuated by pedals 74 and 75 (Figs. 3, 5 and 7) which have crank and rod connections 76—77 therewith. The shaft 72 has thereon a lever 78 provided with an extension 79, and the gear 67 has thereon a lug 80 that has engaging relation with said extension, whereby the clutch 70 is thrown out of action. The oscillating shaft 73 has thereon a lever 81 that has connection with said extension 79 by means of a link 82 by which the actuating member 71' is thrown out of action when the lug 80 engages said extension in the opposite direction from that in the previous instance. By this mechanism one or the other of said clutches is thrown into action so that the back-gear 67 is rotated in one direction or the other accordingly, and to an extent limited by engagement of the lug 80 with the extension 79. In this manner the gear 68 and the tube 32 on which the gear is fixed are rotated in either direction to a limited extent by manipulating the foot pedals upon rotation of the tube 32. The shafts 22 and 29 receive axial movement through the medium of the pinions 33—34 and rack-bars 35 and 36.

The shaft 17 extends through the tube 32 (Figs. 7 and 16) and has adjustably positioned thereon a clutch member 82' that is engageable with another clutch member 81' on the end of the tube 32, so that upon rotation of the tube when the clutch members are engaged, said shaft 17 is actuated accordingly. In this instance, steering of the appliance is controlled by the foot pedals 74 and 75. The gears 33 and 34 (Fig. 16) are secured to the tube 32 in a manner to permit axial adjustment thereon to disengage them from the respective rack-bars 35 and 36, so that the shafts 22 and 29 are thrown out of axial action.

To prevent simultaneous rotation and endwise movement of the shaft 22, (Figs. 7 and 17), the rack-bar 25 is provided with a lug 83 that extends into an annular groove 84 in the shaft 22, so that relative endwise movement between the rack-bar and shaft is prevented, and a pin 85 extends through the rack-bar 35 and has threaded relation therewith, there being a socket 86 in the shaft 22 into which the pin enters, and thereby turning movement of the shaft relative to the rack-bar is prevented. Also, a perforated bracket 87 fixed on the frame 4, extends over the rack-bar and is disposed so as to receive the upper end of the pin 85 in its perforation when the pin is withdrawn from the socket 86 in the shaft, and in this manner relative endwise movement of the rack-bar and shaft is prevented, while at the same time permitting the shaft to rotate.

The frame 4 has fixed therein two transversely disposed tubes 88 and 89 (Figs. 4, 5 and 7) and above the rearmost tube 89 is mounted a rock-shaft 90 having loosely mounted thereon a series of arms 91. Also, positioned in the frame, parallel with the tube 89, is an operating rock-shaft 92 having fixed thereon a series of arms 93, there being a link 94 connecting each arm 93 with the corresponding arm 91 so that when the operating shaft 92 is rocked, the arms 91 will be accordingly turned upon the shaft 90. Upon the shaft 90 is loosely mounted a series of bifurcated levers 95 (Figs. 4 and 6) and on said shaft, between the sides of each lever, is fixed a quadrant 96 that has spaced lugs 97 engageable with said lever at opposite points so as to admit of limited play of the quadrant relative to said lever.

An elevating means is provided to which various tillage tools are attachable to be supported thereby.

The rock-shaft 92 has fixed thereon an operating lever 98 by which it is manipulated. Upon each side of the lever 95 is fixed a notched flange 99 and upon the rock-shaft 90, between each side of the lever 95 and the adjacent arm 91, is positioned a coil spring 100, one end of which spring is secured to the outer end of the arm 91, its other end being adjustably secured in the corresponding notched flange 99, said springs tending to swing the levers 95 upwardly with more or less force accordingly as adjusted in connection with the notched flanges thereon. When the arms 91 are moved upwardly, as by rocking the shaft 92, the tension of said springs is thereby increased to a corresponding extent. The lever 95 has at its outer end a hook 101 with which the tillage tools are attachable so as to be suspended therefrom and to be counterbalanced to a more or less extent through the tension of the spring 100 in a manner similar to that set forth in my previous Patent No. 1,462,022, issued July 17, 1923, and also in my previous Patent No. 1,593,504 issued July 20, 1926.

A windlass is provided on the carrier that is operatively related with the shaft 37 to be actuated thereby, the windlass being contained in the case 23, the purpose of the windlass being to actuate the elevating means, by which the tillage tools are supported, through power derived from the tractor engine. The shaft 90 has fixed thereon an arm 102 (Figs. 3, 5, 12 and 14) having secured at its outer end a cable 103, which is wound upon a drum 104, which has in fixed relation therewith a brake-wheel 105, said wheel and drum being loosely mounted upon the shaft 37. A clutch 106 splined on the shaft 37 has engagement with the brake-wheel 105 whereby said wheel and drum are caused to rotate with said shaft when engaged by the clutch. A fork 107 on the lever 55 has operating relation with said clutch member, and a brake-band 108 is secured at one end to the frame 4 and at its opposite end to a bell-crank 109 that is pivoted on a shaft 110, the bell-crank being coupled to the operating lever 55 by a link 111. The brake-band bears upon the brake-wheel 105 with more or less force accordingly as the lever 55 is swung forwardly; and the clutch 106 is thrown out, and in this manner retraction of the drum is prevented. Fixed upon the cable 103 is a lug 112 that engages with a slotted arm 113 through which the cable extends, and which arm is fixed on the shaft 110, whereby when the cable is wound upon the drum 104 to a predetermined extent, the shaft 110 is rocked so that the brake clutch 106 is thrown out of action and the brake band is simultaneously applied. As the cable is wound upon the drum, the shaft 90 is rocked through the medium of the arm 102, and the quadrant 96 is thereby actuated upwardly by the lever 95. Normally, the lever 55 is held in its forward position by a spring 114 with sufficient force as to effectively sustain the brake-band in action.

The invention is utilized in connection with attachments for carrying out agricultural operations, such attachments, for example, as a cultivator (Fig. 30). A group of cultivators are connected with the carrier. Each cultivator consists of a beam 115 which is attached to the shaft 22—22′ in the frame and has a guide-post 116 that slides in a bracket 30 on the shaft 29 so that when said shafts 22—29 are moved axially, as by the gearing in the case 31, said beams will be moved accordingly. Each beam has mounted thereon a series of blades 117 which engage the ground and the beam is supported by a chain 118 that is suspended from the hook 101 on the corresponding lever 95. In this manner the weight of the beam and its blades is to an extent counterbalanced by the corresponding springs 100 that tend to sustain the lever 95 in elevated position. As said lever has limited downward movement, the cultivator suspended therefrom is prevented from entering the ground beyond a predetermined depths. For the accommodation of additional cultivators, there is provided an extension frame 119 of piping attachable to each side of the carrier to the corresponding ends of the pipes 88 and 89 (Figs. 3, 5, 7 and 30), there being but one of said extension frames shown. Also, in connection with said extension frame are provided extension shafts 22′ and 29′ that are respectively connected with the corresponding ends of the shafts 22 and 29.

On the extension shaft 29 are provided a pair of swinging brackets 35 longitudinally movable with said shaft and are connected with corresponding cultivators as in the former instance. Thus, as the shafts 22 and 29 are adjustably moved in the frame of the carrier, the entire group of cultivators is bodily shifted laterally, respecting the path of the tractor and carrier, without changing the course of the tractor. This operation is carried out by applying pressure to one or the other of the pedals 74—75 which control the gearing in the case 31. The cultivators are raised bodily from the ground by manipulating the windlass lever 55 which places the drum 104 into action and results in the upward swinging movement of the lever 95—95′ from which the cultivators are suspended.

Figure 31:
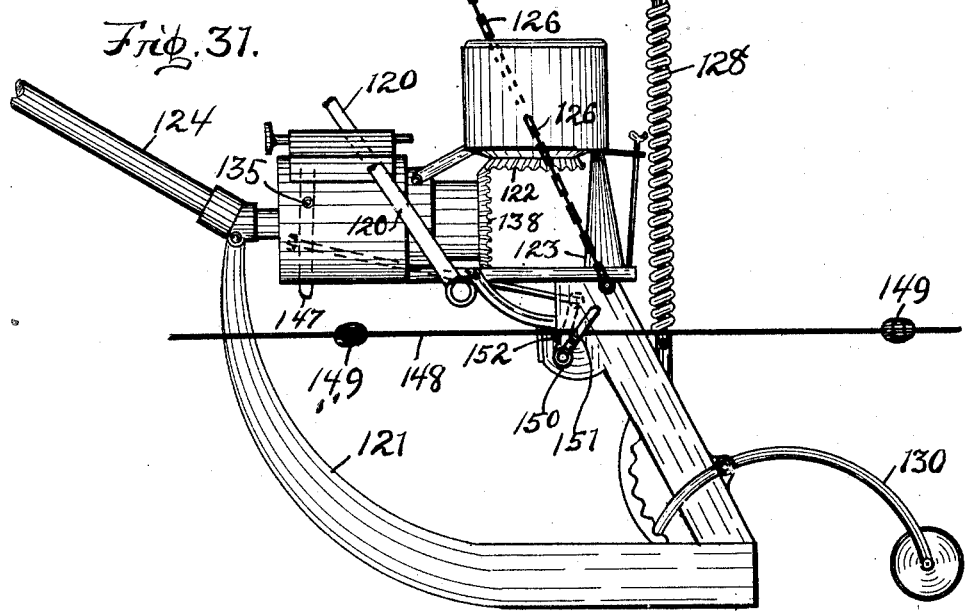
Fig. 31 is a side elevation of a planter attachment for the carrier.

In the event of utilizing corn planters with the apparatus, the planters, such as shown in Fig. 31, are attached to the brackets 30—30′ by means of corresponding pairs of posts 120 and are connected respectively with the stub shafts 27—27′ which extend in-to the corresponding tubes 124 of the planters and have connection in a suitable manner with the mechanism of the planter which is actuated thereby upon rotation of said stub-shafts. Each planter has a vertical post 127 having thereon a compression spring 128 and a bracket 129 is fixed on the rock-shaft 92 through the outer end of which bracket the post 127 loosely projects. By operating the lever 98, downward pressure is applied by the bracket against the spring, and thereby the shoe 121 of the planter is correspondingly pressed into the ground.

By manipulating the lever 55, the brake-band 108 is relieved, and the clutch 45 is thrown into action which causes the winding drum to revolve so that the cable becomes wound thereon and the lever 95 raised. In this manner the farm machine suspended from the arm is elevated. As the cable 103 is wound upon the drum, the lug 112 engages the slotted arm 113 causing the shaft 110 to rock, whereupon the lever 55 is thrown forward and the clutch 45 is thrown out of action, and the brake-band 108 is re-applied, thus sustaining the farm machine in elevated position so that the tractor and carrier may be maneuvered without affecting the farm machines.

When the cultivators are employed, the screw 85 (Fig. 17) is adjusted so as to enter the socket and be free from the bracket 87, and the gear 44 is removed to permit axial movement of the shaft 22 and rack 35, and prevent rotation of the shaft. Also the clutch 82′ (Figs. 7 and 16) is thrown out to permit hand operation of the steering gear. By operating the foot pedals 74 and 75 the shafts 22 and 29 and their extensions 22′ and 29′ together with the cultivators attached thereto are moved to one side or the other as may be required to avoid obstructions.

When the planters are employed, the screw 85 is adjusted into the bracket 87 and out of the shaft 22, and the gear 44 is replaced, so that axial movement of the shaft is prevented and rotation thereof permitted, whereupon the mechanism of the planters are actuated, and the planters are held in fixed spaced relation with each other.

What I claim is:—

1. In apparatus of the class described, a tractor; a wheeled carrier including a frame attached to said tractor; tillage tools operatively related with said carrier; a pair of horizontal shafts spaced apart and disposed transversely in the frame of the carrier; detachable extensions for each side of said frame and for each end of each of said shafts; means for adjustably moving said shafts axially, one of said shafts being revoluble; a transmission gearing operatively related with the engine of said tractor, and arranged to actuate said shafts axially; a second gearing operatively related with said engine and the rotatable shaft for rotating said rotatable shaft; means for locking said rotatable shaft against axial or rotary movement selectively; an elevating means on said carrier supporting said tillage tools; a windlass provided with a clutch operatively related with said elevating means and said engine; a brake securing said windlass against movement when thrown out of action; a clutch controlling said second gearing; a spring restrained means related with said windlass, brake, and gearing clutch, disposed, when manipulated, to throw the windlass into action, release the brake, and throw the gearing clutch out of action simultaneously; automatic means operable to return said spring restrained means to normal position; and actuating connections between said tillage tools and said rotatable shaft.

2. In apparatus of the class described, a tractor; a wheeled carrier attached to said tractor; tillage tools operatively related with said carrier; a pair of horizontal shafts spaced apart and disposed transversely in the frame of the carrier; detachable extensions for each side of said frame and for each end of each of said shafts; means for adjustably moving said shafts axially, one of said shafts being revoluble; a transmission gearing operatively related with the engine of said tractor, and arranged to actuate said shafts axially; a second gearing operatively related with said engine and the rotatable shaft for rotating said shaft; an elevating means on said carrier; a clutch controlled windlass operatively related with said elevating means and said engine for actuating said means; a brake securing said windlass against movement when the windlass clutch is thrown out of action; a clutch controlling said second gearing; a spring restrained means related with said windlass; brake and gearing clutch disposed, when manipulated, to throw the windlass into action, release the brake, and throw the gearing clutch out of action simultaneously; automatic means operable to return said spring restrained means to normal position; and connections for attaching tillage tools to said shafts and elevating means.

3. In apparatus of the class described; a tractor; a wheeled carrier attached to said tractor; tillage tools operatively related with said carrier; a pair of horizontal shafts spaced apart and disposed transversely in the frame of the carrier; means for adjustably moving said shafts axially, one of said shafts being revoluble; a transmission gearing operatively related with the engine of said tractor, and arranged to actuate said shafts axially; a second gearing operatively related with said engine and the rotatable shaft for rotating said shaft; an elevating means on said carrier; a clutch controlled windlass operatively related with said elevating means and said engine for actuating said means; a brake securing said windlass against movement when thrown out of action; a clutch controlling said second gearing; a spring restrained means related with said windlass, brake and gearing clutch, disposed, when manipulated, to throw the windlass into action, release the brake, and throw the gearing clutch out of action simultaneously; automatic means operable to return said spring restrained means to normal position; and connections for attaching said tillage tools to said shafts and elevating means.

4. An implement of the class described consisting of a tractor and wheeled carrier attached together; tillage tools operatively related with said carrier; a shaft horizontally disposed transversely in the frame of the carrier; a gearing operatively related with said engine and said shafts for imparting rotary movement thereto; an elevating means on said carrier; a clutch controlled windlass operatively related with said elevating means and said engine for actuating said means; a brake securing said windlass against movement when the windlass is thrown out action; a clutch controlling said gearing; a spring restrained means related with said windlass, brake and gearing clutch disposed, when manipulated, to throw the windlass into action, release the brake and throw the gearing clutch out of action simultaneously; automatic means operable to return said spring restrained means to normal position when the elevating means has been raised; connections for suspending said tillage tools from said elevator; and gearing connections between said shaft and the mechanism of said tools for actuating same.

5. An implement of the class described consisting of a tractor and wheeled carrier attached together; tillage tools operatively related with said carrier; a revoluble shaft horizontally disposed transversely in the frame of the carrier; a transmission gearing operatively related with the engine of said tractor and shaft for reciprocating said shaft axially; a second gearing operatively related with said engine and the shaft for imparting rotary movement to said shaft; means for locking said shaft against axial or rotary movement selectively, there being a removable gear in said second gearing to eliminate rotary movement of said shaft by removal thereof; pedal operated means controlling said transmission gearing; an elevating means on said carrier; a clutch controlled windlass operatively related with said elevating means and said transmission gearing for actuating said elevating means; a brake securing said windlass against movement when thrown out of action; a spring restrained means related with said windlass and brake, disposed, when manipulated, to throw the windlass into action and release the brake simultaneously; automatic means operable to return said spring restrained means to normal position when the elevating means has been raised; and connections for the attachment of said tillage tools to said shaft and elevating means.

6. An implement of the class described consisting of a tractor and wheeled carrier attached together; tillage tools operatively related with said carrier; a revoluble shaft horizontally disposed transversely in the frame of the carrier; a transmission gearing operatively related with the engine of said tractor and shaft for reciprocating said shaft axially; a second gearing operatively related with said engine and the shaft for imparting rotary movement to said shaft; means for locking said shaft against axial or rotary movement selectively, there being a removable bear in said second gearing to eliminate rotary movement of said shaft by removal thereof; pedal operated means controlling said transmission gearing; and connections for the attachment of said tools to said shaft and elevating means.

In testimony whereof I affix my signature.

SAMUEL I. NEHER.